(12) United States Patent
Tang et al.

(10) Patent No.: US 8,487,485 B2
(45) Date of Patent: Jul. 16, 2013

(54) LINEAR SYNCHRONOUS MOTOR

(75) Inventors: Yuqi Tang, Nagano (JP); Satoshi Sugita, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 260 days.

(21) Appl. No.: 13/015,958

(22) Filed: Jan. 28, 2011

(65) Prior Publication Data

US 2011/0187208 A1   Aug. 4, 2011

(30) Foreign Application Priority Data

Jan. 29, 2010   (JP) .................................. 2010-019018

(51) Int. Cl.
    *H02K 41/02*    (2006.01)
(52) U.S. Cl.
    USPC ..................................................... 310/12.18
(58) Field of Classification Search
    USPC ......................................... 310/12.18, 15, 215
    See application file for complete search history.

(56) References Cited

U.S. PATENT DOCUMENTS

| 5,734,209 | A  | * | 3/1998  | Hallidy ...................... 310/12.22 |
| 6,329,728 | B1 | * | 12/2001 | Kitazawa et al. ................ 310/14 |
| 7,915,767 | B2 | * | 3/2011  | Tang et al. .................. 310/12.18 |
| 8,191,857 | B2 | * | 6/2012  | Hansen et al. .............. 251/129.1 |
| 2003/0141769 | A1 |  | 7/2003  | Kubo |
| 2005/0127774 | A1 | * | 6/2005  | Sogabe et al. ................ 310/215 |

FOREIGN PATENT DOCUMENTS

| JP | 62-118755   | 5/1987  |
| JP | 2001-086725 | 3/2001  |
| JP | 2001-286122 | 10/2001 |
| JP | 2003-224961 | 8/2003  |
| JP | 2004-357466 | 12/2004 |
| WO | 2008/117654 | 10/2008 |

* cited by examiner

*Primary Examiner* — Nguyen N Hanh
(74) *Attorney, Agent, or Firm* — Rankin, Hill & Clark LLP

(57) ABSTRACT

A linear synchronous motor is provided, of which a core unit may readily be manufactured. Accordingly, the manufacturing cost of the linear synchronous motor may be reduced, and the weight of the linear synchronous motor may be lightened. The linear synchronous motor includes a frame member that is formed of a magnetic conductive material and surrounds the periphery of a core unit centering on a shaft. The frame member functions as a yoke that magnetically connects a plurality of magnetic pole portions. The frame member is constituted from a first divided frame member and a second divided frame member fixed to the core unit with screws.

9 Claims, 17 Drawing Sheets

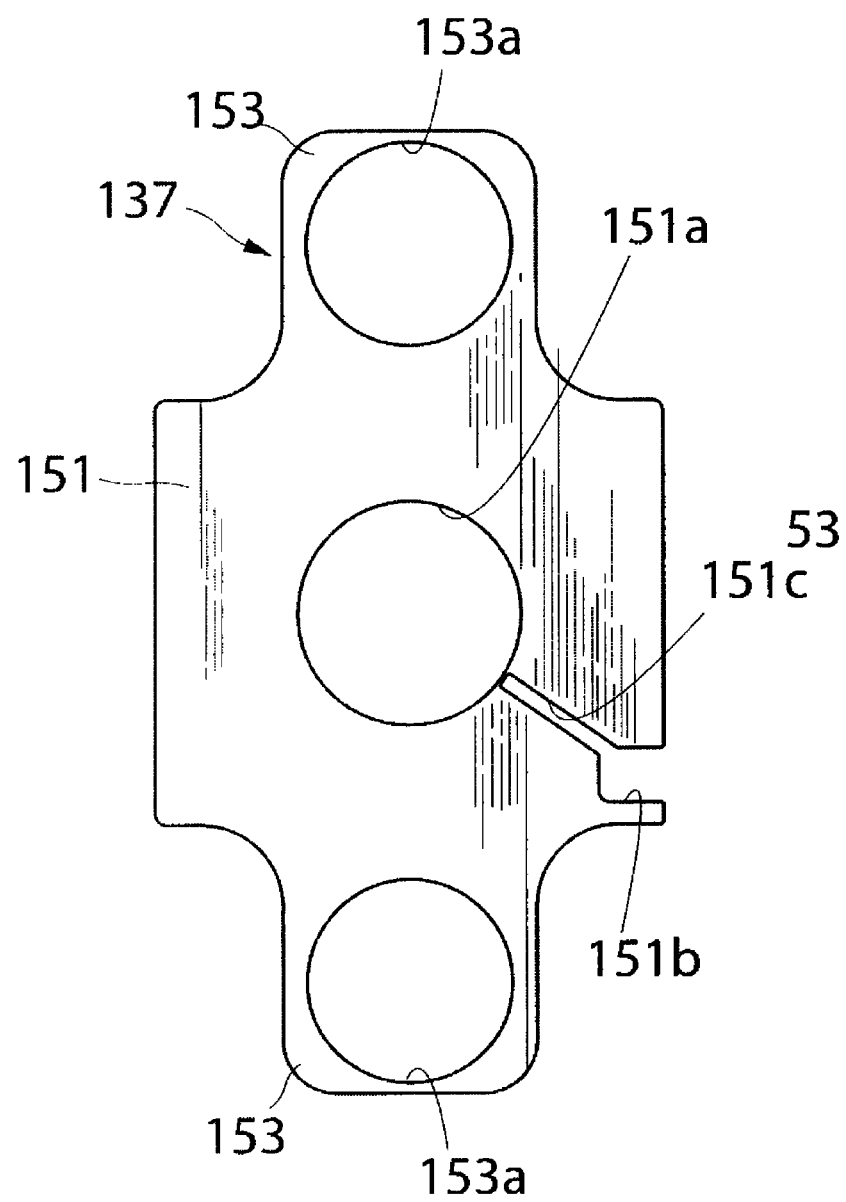

LINEAR SYNCHRONOUS MOTOR

TECHNICAL FIELD

The present invention relates to a linear synchronous motor in which a mover linearly moves relative to a stator.

BACKGROUND ART

Japanese Patent Application Publication No. 2001-286122 (Patent Document 1) discloses a linear synchronous motor comprising a stator and a mover that linearly moves relative to the stator. The mover includes a direct drive shaft reciprocating in an axial direction and an array of permanent magnets including a plurality of permanent magnets fixed to the direct drive shaft. The stator includes a plurality of windings and a core unit with slots formed therein for respectively receiving the plurality of annular windings. The annular windings are each formed of an annularly wound winding conductor and are disposed to surround the direct drive shaft. The core unit is constituted from a plurality of core divided bodies assembled with each other in the axial direction. The core divided bodies are formed by cutting work. In this linear synchronous motor, the core divided bodies are combined with one another to form the core unit comprising a yoke. When the yoke is formed by combining the core divided bodies, however, shapes of the core divided bodies become complex. The manufacturing cost of the linear synchronous motor may be therefore increased. Further, when the core divided bodies are formed by cutting work, efficiency of the linear synchronous motor deteriorates due to eddy current generation.

Considering a loss due to an eddy current, preferably, a plurality of magnetic pole portions and the yoke are separately formed, and the magnetic pole portions are formed by laminating a plurality of magnetic steel plates.

SUMMARY OF THE INVENTION

However, even if the magnetic pole portions and the yoke have been separately formed, the weight of the linear synchronous motor remains unchanged from the weight of the conventional linear synchronous motor. The manufacturing cost of the linear synchronous motor cannot also be reduced.

An object of the present invention is to provide a linear synchronous motor of which the manufacturing cost may be reduced, and of which the weight may be lightened.

In addition to the above objects, another object of the present invention is to provide a linear synchronous motor in which lubricating oil may be readily injected into a slide bearing that reciprocatably supports a mover relative to a stator.

A linear synchronous motor of the present invention includes a first assembly and a second assembly. The first assembly includes a shaft and at least one array of a plurality of permanent magnets mounted on the shaft. The second assembly includes a core unit and a plurality of windings each formed of an annularly wound winding conductor and disposed at predetermined intervals in an axial direction of the shaft to surround the shaft. The core unit includes a plurality of magnetic pole portions and a yoke. The plurality of magnetic pole portions are formed by laminating or stacking a plurality of magnetic steel plates, and disposed concentrically with the shaft to surround the shaft. The magnetic pole portions each include a magnetic pole surface facing the at least one array of the permanent magnets of the first assembly with a predetermined gap therebetween. The yoke magnetically connects the magnetic pole portions. The magnetic pole portions are also disposed at intervals in the axial direction such that two adjacent magnetic pole portions define a space therebetween where one of the windings is disposed. The first assembly is configured to work as one of a mover and a stator, while the second assembly is configured to work as the other of the mover and the stator. The linear synchronous motor of the present invention includes a frame member surrounding the core unit and centering on the shaft. The frame member is formed of a magnetic conductive material to magnetically connect to the magnetic pole portions, thereby functioning as the yoke. The frame member corresponds to a cover member. The frame member should function as the yoke, and may have a structure entirely or partially surrounding (not surrounding a part of the core unit) the core unit. "The frame member functions as the yoke" herein means that the frame member entirely or partially functions as the yoke. All of the magnetic pole portions may be formed by laminating or stacking the plurality of magnetic steel plates. Alternatively, apart of the magnetic pole portions may be formed by laminating or stacking the plurality of magnetic steel plates.

Since the frame member surrounding the core unit functions as the yoke that magnetically connects the magnetic pole portions, there is no need for using a heavy yoke used in the conventional linear synchronous motor. According to the present invention, the manufacturing cost of the linear synchronous motor may be reduced, and the weight of the linear synchronous motor may be lightened.

The second assembly may include at least one slide shaft fixed to the core unit and disposed in parallel to the shaft. The at least one slide shaft passes through the core unit in a direction parallel to the axial direction. The first assembly includes at least one set of slide bearings that slidably supports both end portions of the at least one slide shaft. The "slide bearings" are herein defined as bearings such as linear guides that support the slide shaft so that the slide shaft may reciprocate relative to the core unit (supported portion) in the axial direction. With this arrangement, the slide shaft is slidably supported by the first assembly (stator) via the slide bearings. The second assembly slides together with the slide shaft. The slide shaft may be directly used as an output shaft of the linear synchronous motor.

In the linear synchronous motor configured as described above, the at least one set of slide bearings may be connected to end portions of the shaft including the array of permanent magnets by a set of connecting members. With this arrangement, the slide bearings may be supported by the shaft of the first assembly (stator). Further, by providing the slide bearings at the connecting members, the slide bearings may be disposed outside the first assembly. For that reason, lubricating oil may be readily injected into the slide bearings.

If the slide shaft is structured to have a cylindrical shape, it may be so arranged that a cooling medium such as water for cooling the windings flows through a hollow inside of the slide shaft. The cooling medium may be directly flown through the hollow inside. Alternatively, a cooling tube may be disposed inside the hollow inside of the slide shaft, and the cooling medium may be flown into the cooling tube. With this arrangement, the windings may be readily cooled, using the slide shaft.

The frame member may be formed of a plurality of divided frame members fixed to the core unit with screws. By mounting the divided frame members to the core unit, the frame member may be readily disposed around the core unit.

The divided frame members may be constituted from divided frame members of a first type and a second type. The divided frame members of the first type contact an outer peripheral surface of the core unit. The divided frame members of the second type are each disposed across faced portions of two divided frame members of the first type and fixed to the core unit with screws together with the two divided frame members of the first type. Since the divided frame members of the second type are each disposed across faced portions of two divided frame members of the first type, an increase in magnetic resistance of the frame member may be prevented even if the gap is formed between the faced portions.

The magnetic pole portions may each include at least one connected portion and may be disposed such that the at least one connected portion of each magnetic pole portion is disposed along the shaft to form at least one array of the connected portions. In this case, the at least one slide shaft may be disposed to pass through the connected portions that form the at least one array of the connected portions. With this arrangement, the magnetic pole portions may be positioned to connect one another, using the slide shaft.

The magnetic pole portions may be constituted from a pair of end magnetic portions positioned at both ends in the axial direction and one or more intermediate magnetic portions positioned between the pair of end magnetic pole portions. The frame member should be fixed to the pair of end magnetic pole portions with screws. With this arrangement, the frame member may be readily mounted on the core unit.

A mold portion made of an insulating molding resin may be formed between the frame member and the windings.

BRIEF DESCRIPTION OF THE DRAWINGS

These and other objects and many of the attendant advantages of the present invention will be readily appreciated as the same becomes better understood by reference to the following detailed description when considered in connection with the accompanying drawings.

FIG. 13 is a plan view of an intermediate magnetic pole portion used in the linear synchronous motor shown in FIG. 10.

DETAILED DESCRIPTION OF PREFERRED EMBODIMENTS

Figure 1:
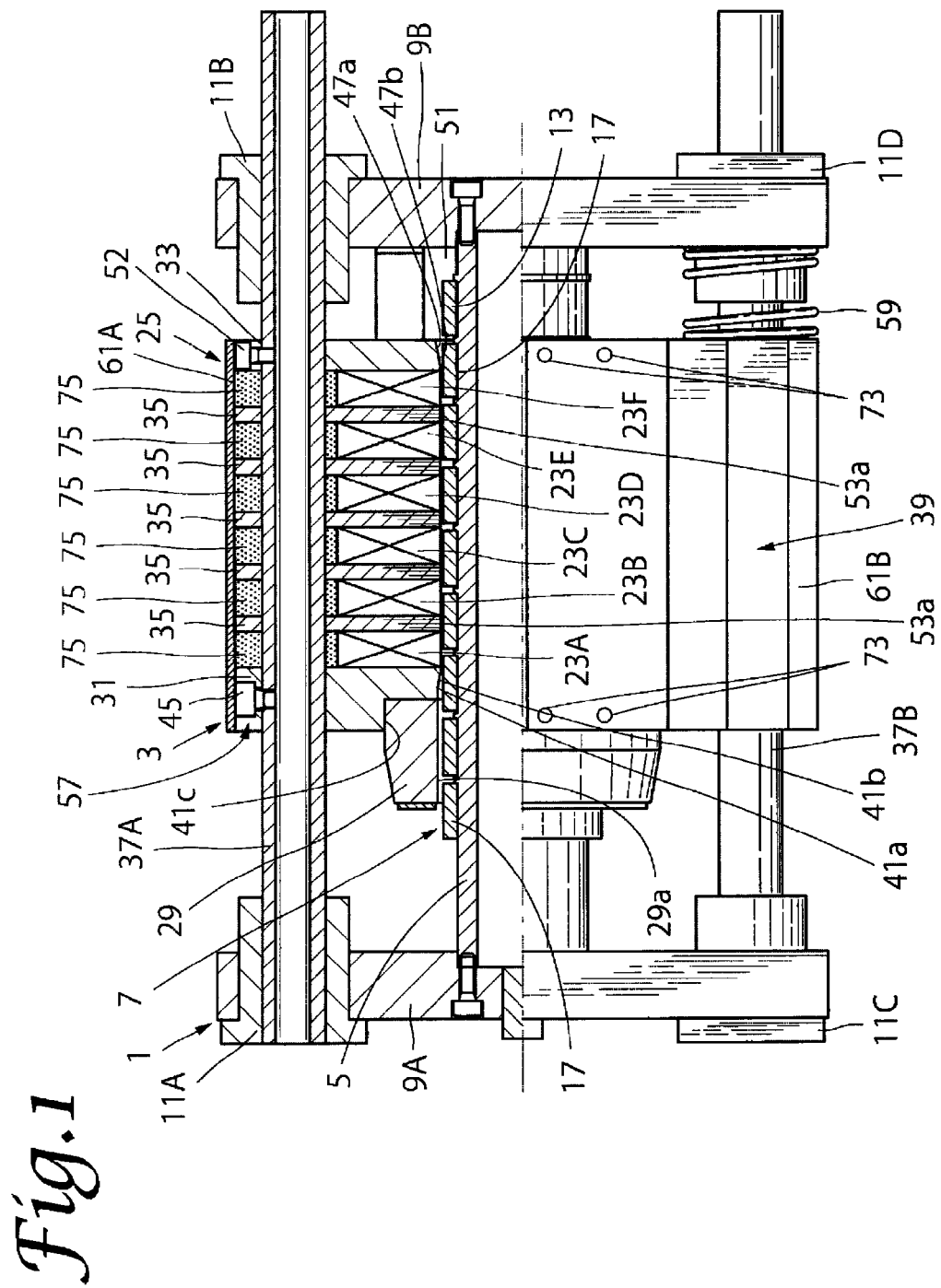
FIG. 1 is a vertical half-sectional view of a linear synchronous motor in an embodiment of the present invention.
Figure 2:
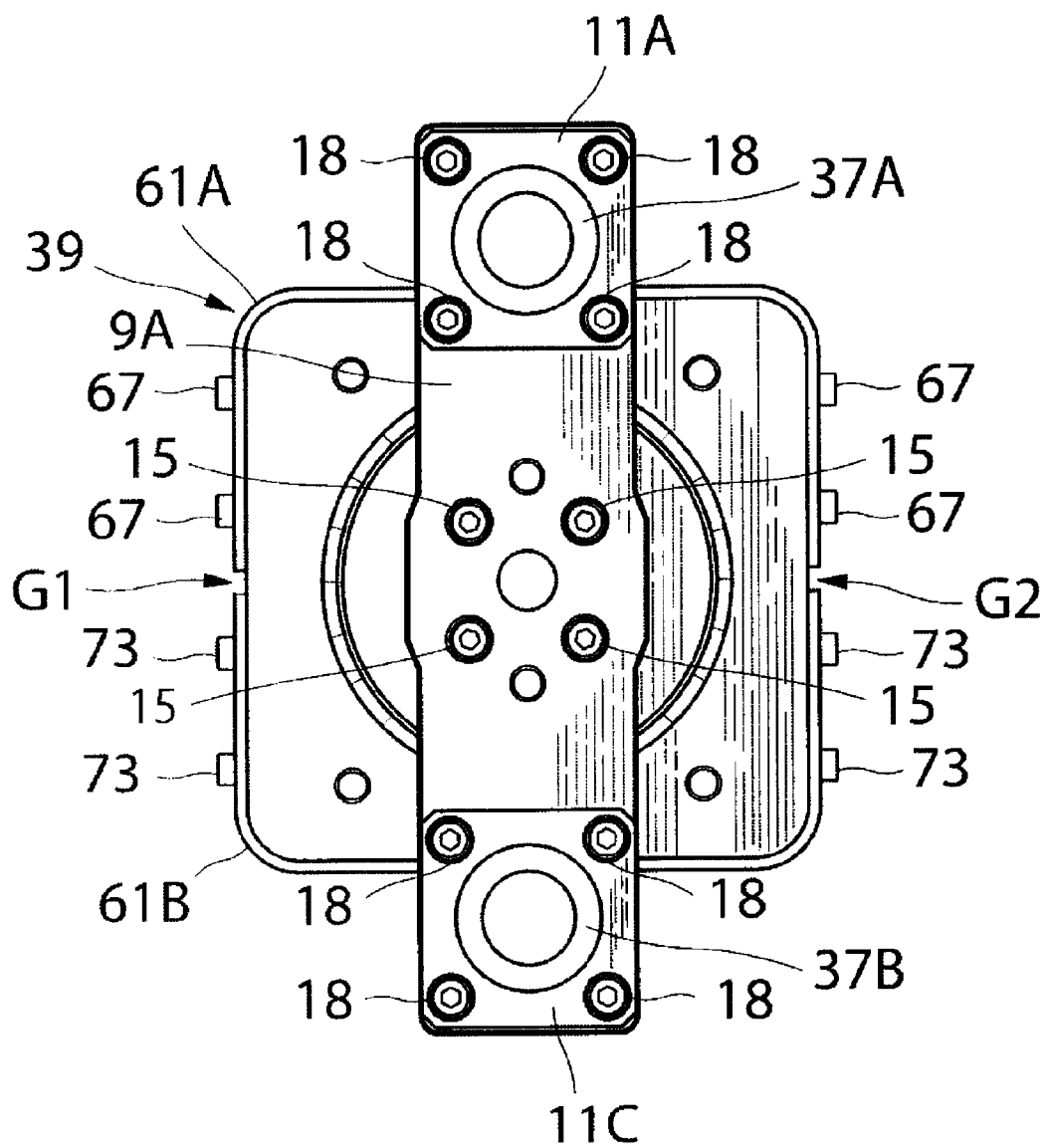
FIG. 2 is a left side view of the linear synchronous motor shown in FIG. 1.
Figure 3:
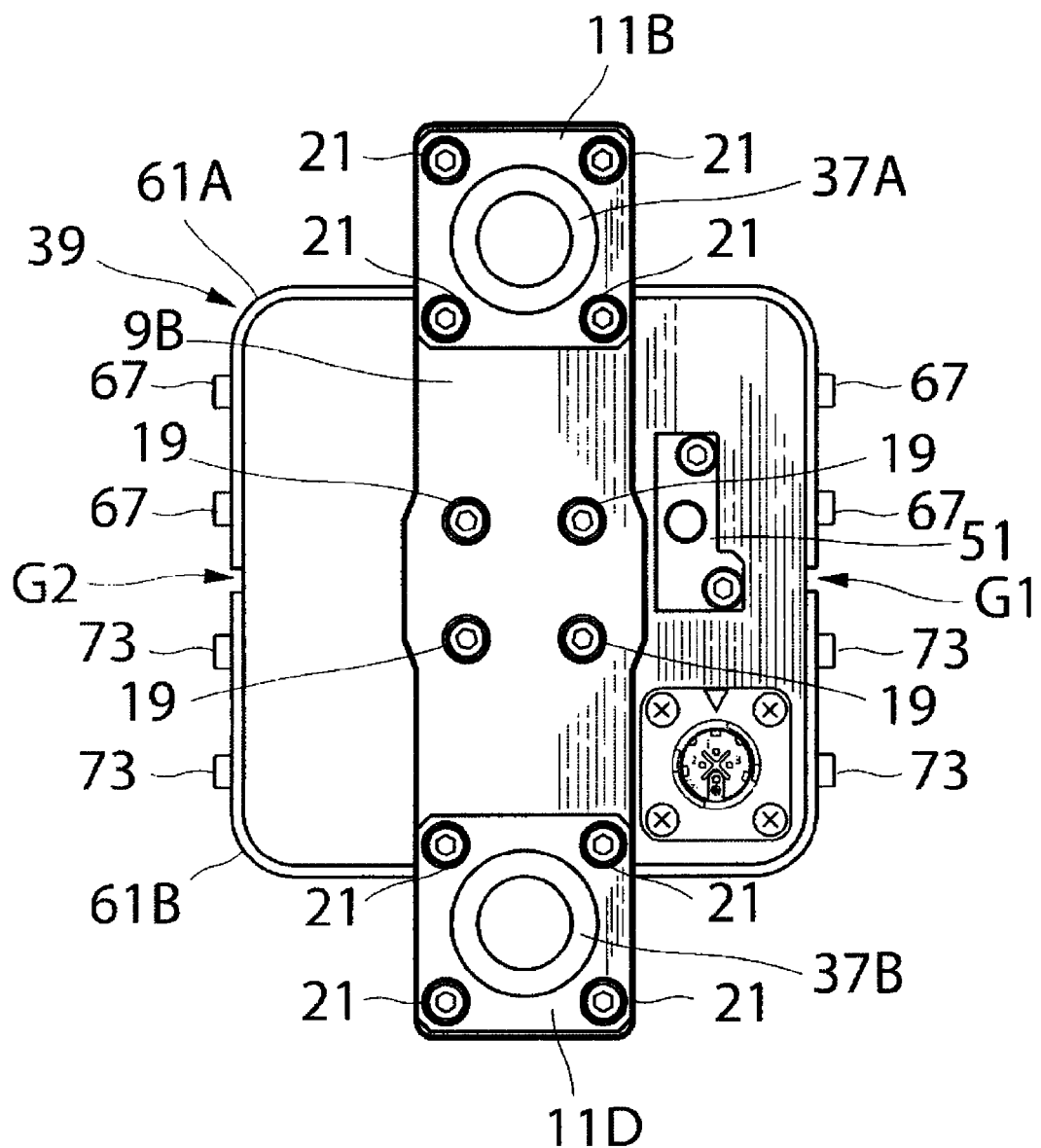
FIG. 3 is a right side view of the linear synchronous motor shown in FIG. 1.

Now, embodiments of the present invention will be described below in detail. FIGS. 1 to 3 are respectively a front view, a left side view, and a right side view of a linear synchronous motor in an embodiment of the present invention. FIG. 1 is a vertical half-sectional view of the linear synchronous motor. The linear synchronous motor in this embodiment includes a first assembly 1 configured to work as a stator and a second assembly 3 configured to work as a mover, as shown in FIG. 1. The first assembly 1 includes the shaft 5, an array of permanent magnets 7, a first connecting member 9A and a second connecting member 9B, a first slide bearing 11A, a second slide bearing 11B, a third slide bearing 11C, and a fourth slide bearing 11D, and a permanent magnet for detection 13. The shaft 5 is made of a magnetic material, and has an elongated cylindrical shape. The array of permanent magnets 7 comprises eight circular annular permanent magnets 17 fit with an outer periphery of the shaft 5 and arranged in an axial direction of the shaft 5. The eight permanent magnets are constituted from four circular annular permanent magnets magnetized such that N-pole appears on a radially outer surface of the shaft 5, and four circular annular permanent magnets magnetized such that S-pole appears on the radially outer surface of the shaft 5. These eight permanent magnets are arranged such that the N-pole and the S-pole alternately appear in the axial direction. In this embodiment, one permanent magnet 17 is constituted from six circular arc-shaped permanent magnet pieces arranged in a peripheral direction of the shaft 5. The permanent magnet pieces are fixed to the shaft 5 by adhesive. The permanent magnets may be directly fixed to the outer periphery of the shaft 5 as in this embodiment. Alternatively, the permanent magnets may be indirectly fixed to the shaft 5. To take an example, a magnet mounting portion may be fixed to the outer periphery of the shaft 5, and the array of permanent magnets (plurality of permanent magnets) may be fixed to the magnet mounting portion.

The first connecting member 9A is made of aluminum. As shown in FIG. 2, one end portion of the shaft 5 is connected to a central portion of the first connecting member 9A by four screws 15. The first slide bearing 11A and the third slide bearing 11C are respectively connected to both end portions of the first connecting member 9A by screws 18. The first slide bearing 11A, the third slide bearing 11C, and the one end portion of the shaft 5 are connected by the first connecting member 9A. The second connecting member 9B is also made of aluminum. As shown in FIG. 3, the other end portion of the shaft 5 is connected to a central portion of the second connecting member 9B by four screws 19. The second slide bearing 11B and the fourth slide bearing 11D are respectively connected to both end portions of the second connecting member 9B by screws 21. The second slide bearing 11B, the fourth slide bearing 11D, and the other end portion of the shaft 5 are connected by the second connecting member 9B.

Figure 4A:
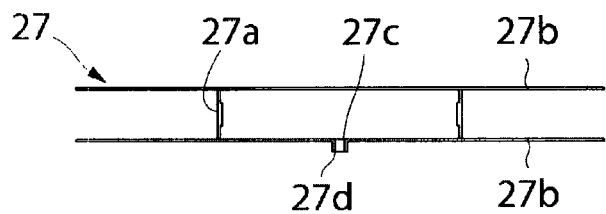
FIG. 4A is a plan view of a bobbin used in the linear synchronous motor shown in FIG. 1.
Figure 4B:
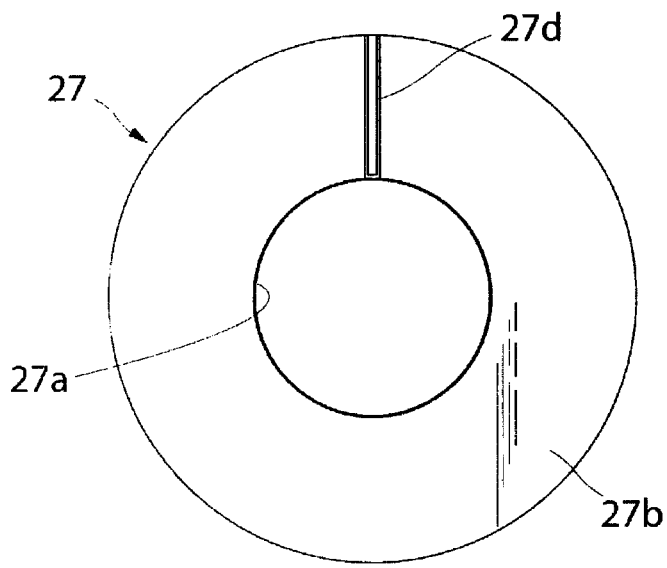
FIG. 4B is a front view of the bobbin used in the linear synchronous motor shown in FIG. 1.
Figure 4C:
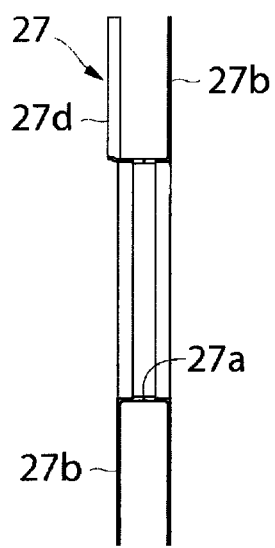
FIG. 4C is a vertical cross-sectional view of the bobbin used in the linear synchronous motor shown in FIG. 1.

As shown in FIG. 1, the second assembly 3 includes six windings 23A to 23F and a core unit 25. The six windings 23A to 23F are each formed of an annularly wound winding conductor. The windings 23A to 23F are arranged at intervals in the axial direction of the shaft 5 to surround the shaft 5. Three phases (U phase, V phase, and W phase) of excitation currents mutually shifted by an electrical angle of 120° flow into the six windings 23A to 23F. More specifically, the excitation currents of U phase, -U phase, -V phase, V phase, W phase, -W phase respectively flow into the six windings 23A to 23F. Each of the windings 23A to 23F is held in a bobbin 27 shown in FIGS. 4A to 4C. The bobbin 27 is made of an insulating synthetic resin material that insulates the windings 23A to 23F from magnetic pole portions (31, 33, 35) which will be described later. The bobbin 27 includes in a central part thereof a cylindrical portion 27a through which the shaft 5 passes, and a pair of flange portions 27b. The pair of flange portions 27b are unitarily provided at both ends of the cylindrical portion 27a and extends in a direction orthogonal to the axial direction of the shaft 5. A slot portion 27c is formed in one of the pair of flange portions 27b. The slot portion 27c radially extends to lead out the winding-starting end of the lead wire of each of the windings 23A to 23F radially outward of the flange portions 27b of the bobbin 27. Then, a protruding portion 27d protruding in a direction away from the other of the pair of flange portions 25b is unitarily formed on the one of the pair of flange portions 27b. The slot portion 27c is formed inside the protruding portion 27d. The winding-start end of the lead wire of each of the windings 23A to 23F extracted through the slot portion 27c is received in the protruding portion 27d. The bobbins 27 which respectively receive the windings 23A to 23F inside thereof are shaped and dimensioned to allow insertion between two adjacent magnetic pole portions (31 and 35, and 35, and 33 and 35) after five intermediate magnetic pole portions 35 that will be described later have been positioned and fixed.

As shown in FIG. 1, the core unit 25 includes a bracket bush 29, an output side end magnetic pole portion 31, an opposite output side end magnetic pole portion 33, and the five intermediate magnetic pole portions 35. The bracket bush 29 is formed by cutting a non-magnetic material such as an aluminum plate, and has an annular shape. The bracket bush 29 is fit into a concave portion 41c of the output side end magnetic pole portion 31. A through-hole 29a for passing through the shaft 5 is formed in a central portion of the bracket bush 29.

Figure 5:
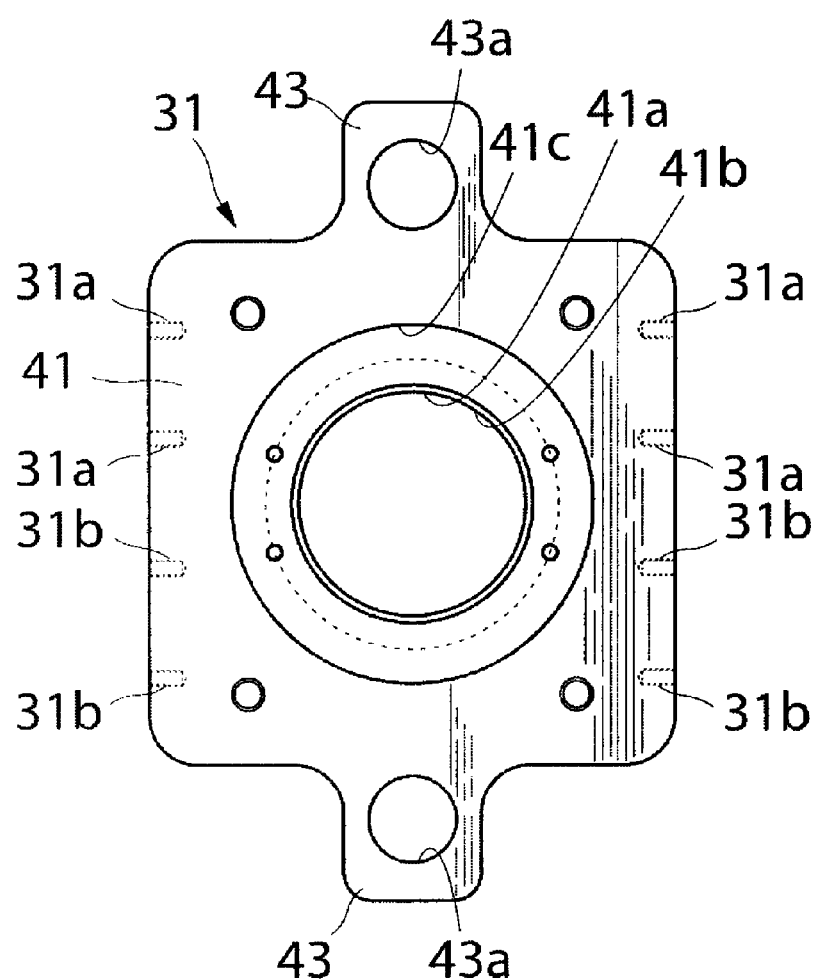
FIG. 5 is a plan view of an output side end magnetic pole portion used in the linear synchronous motor shown an FIG. 1.

As shown in FIG. 5, the output side end magnetic pole portion 31 includes a main body portion 41 having a substantially rectangular contour, and a pair of connected portion 43 comprising a first connected portion and a second connected portion respectively located on upper and lower sides of the main body portion 41 on the page of FIG. 5. The output side end magnetic pole portion 31 is formed by cutting a magnetic steel plate of a predetermined thickness. A through-hole 41a for passing through the shaft 5 is formed in a central part of the main body portion 41. The pair of connected portions 43 are opposed to each other, centering on the shaft 5. An inner peripheral wall surface of the through-hole 41a constitutes a magnetic pole surface 41b facing the array of permanent magnets 7 with a predetermined gap therebetween. As shown in FIG. 1, the magnetic pole surface 41b is configured so that, the more the magnetic pole surface 41b is apart from the adjacent intermediate magnetic pole portion 35 in the axial direction, the gap between the magnetic pole surface 41b and the array of permanent magnets 7 increases more. The concave portion 41c for fatting the bracket bush 29 into the main body portion 41 is formed in a surface of the main body portion 41 on the side of the bracket bush 29. Through-holes 43a for respectively passing through first and second slide shafts 37A and 37B, which will be described later, are formed in the respective centers of the pair of connected portions 43. The first slide shaft 37A and the second slide shaft 37B are respectively fixed to the pair of connected portions 43 by screws 45, as shown in FIG. 1.

Figure 6:
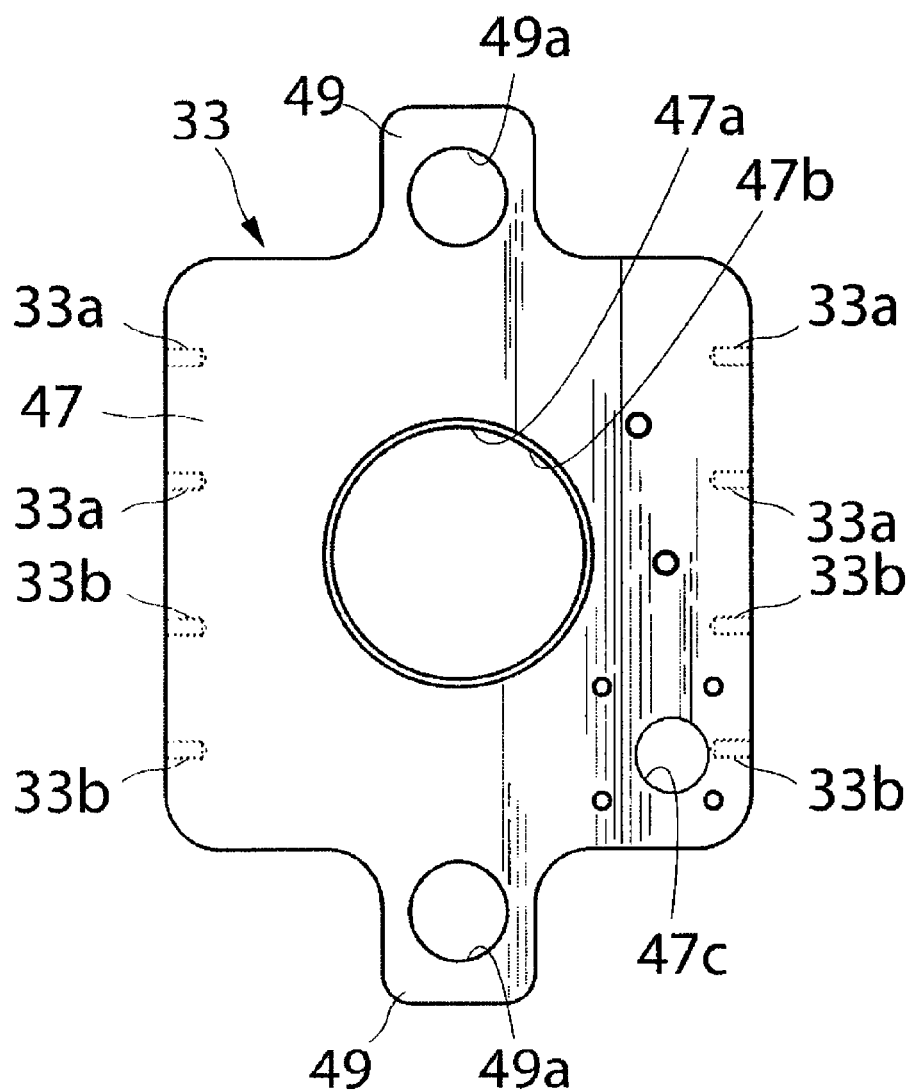
FIG. 6 is a plan view of an opposite output side end magnetic pole portion used in the linear synchronous motor shown in FIG. 1.

As shown in FIG. 6, the opposite output side end magnetic pole portion 33 includes a main body portion 47 having a substantially rectangular contour, and a pair of connected portions 49 comprising a first connected portion and a second connected portion respectively located on upper and lower sides of the main body portion 47 on the page of FIG. 6. The opposite output side end magnetic pole portion is formed by cutting a magnetic steel plate of a predetermined thickness. A through-hole 47a for passing through the shaft 5 is formed in a central part of the main body portion 47, as shown in FIG. 1. The pair of connected portions 49 are opposed to each other, centering on the shaft 5. An inner peripheral wall surface of the through-hole 47a constitutes a magnetic pole surface 47b facing the array of permanent magnets 7 with a predetermined gap therebetween. As shown in FIG. 1, the magnetic pole surface 47b is configured so that, the more the magnetic pole surface 47b is apart from the adjacent intermediate magnetic pole portion 35 in the axial direction, the gap between the magnetic pole surface 47b and the array of permanent magnets 7 increases more. A through-hole 47c for passing through a lead wire bundle comprising a bundle of the windings 23A to 23F is formed in the main body portion 47, as shown in FIG. 6. A hall element 51 is fixed to an outer surface of the opposite output side end magnetic pole portion 33, as shown in FIG. 1. The permanent magnet for detection 13 is provided on the shaft 5 to face the hall element 51. Then, magnetic pole detection is performed by the hall element 51 and the permanent magnet for detection 13. Through-holes 49a for respectively passing through the first and second slide shafts 37A and 37B are formed in the respective centers of the pair of connected portions 49. The first slide shaft 37A and the second slide shaft 37B shown in FIG. 1 are respectively fixed to the pair of connected portions 49 by screws 52, as shown in FIG. 1.

Figure 7:
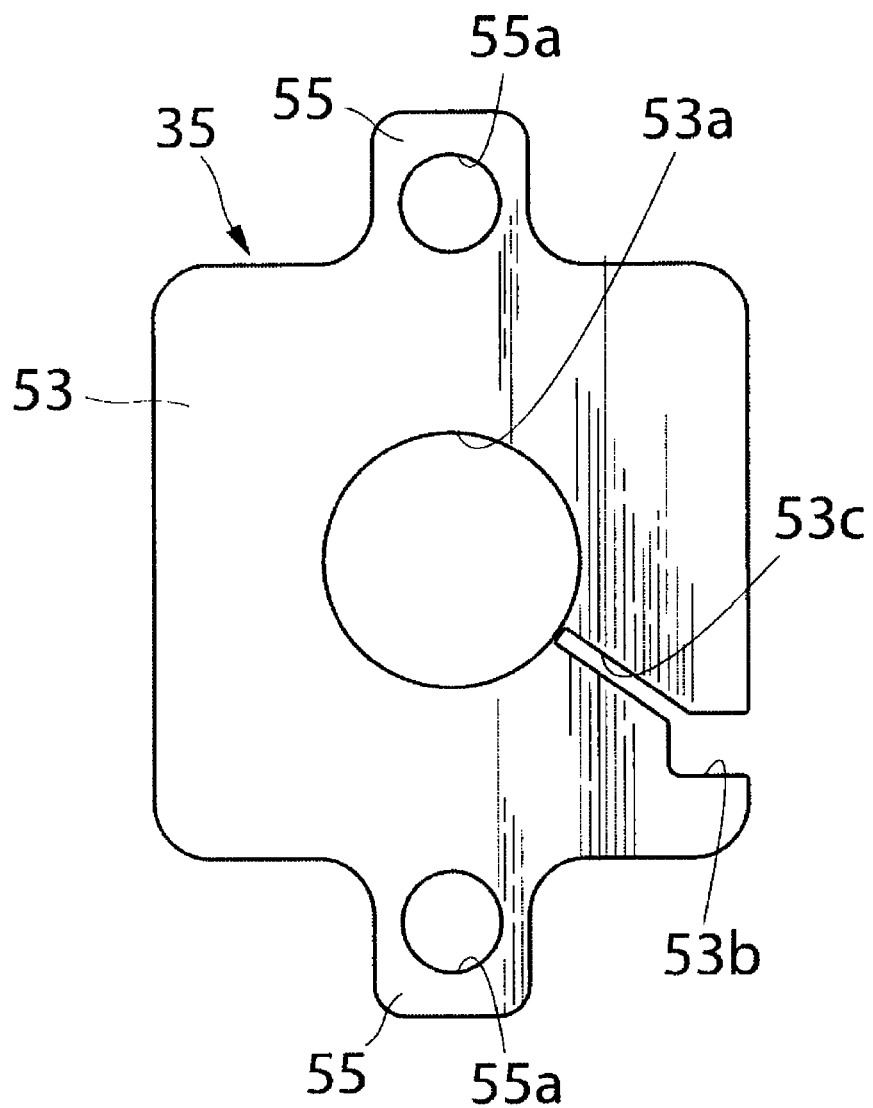
FIG. 7 is a plan view of an intermediate magnetic pole portion used in the linear synchronous motor shown in FIG. 1.

As shown in FIG. 7, each of the five intermediate magnetic pole portions 35 includes a main body portion 53 having a rectangular contour and a pair of connected portions comprising a first connected portion and a second connected portion respectively located on upper and lower sides of the main body portion 53 on the page of FIG. 7. The intermediate magnetic pole portions 35 are formed by laminating or stacking a plurality of magnetic steel plates in the axial direction of the shaft 5. As shown in FIG. 1, the five intermediate magnetic pole portions 35 are disposed in the axial direction between the output side end magnetic pole portion 31 and the opposite output side end magnetic pole portion 33. A through-hole 53a for passing through the shaft 5 is formed in a central part of the main body portion 53. The pair of connected portions 55 are opposed to each other, centering on the shaft 5. An inner peripheral wall surface of the through-hole 53a constitutes a magnetic pole surface facing the array of permanent magnets 7 with a predetermined gap therebetween. A lead wire through-hole 53b for passing through a lead wire together with a resin is formed in a corner of the main body portion 53. A bobbin fitting slot 53c for fitting the protruding portion 27d of the bobbin 27 thereinto is formed between the through-hole 53a and the lead wire through-hole 53b. The bobbin fitting slot 53c communicates with the lead wire through-hole 53b. Through-holes 55a for respectively passing through the first slide shaft 37A and the second slide shaft 37B are formed in the respective centers of the pair of connected portions 55.

In this embodiment, as shown in FIG. 1, the output side end magnetic pole portion 31, the five intermediate magnetic pole portions 35, and the opposite output side end magnetic pole portion 33 are disposed at intervals in the axial direction such that two adjacent divided cores (31 and 35, 35 and 35, and 35 and 33) define a space therebetween where one of the windings (23A to 23F) is disposed. In this embodiment, the output side end magnetic pole portion 31, the opposite output side end magnetic pole portion 33, and the five intermediate magnetic pole portions 35 constitute a plurality of magnetic pole portions. The magnetic pole portions are disposed concentrically with the shaft 5 to surround the shaft 5. The output side end magnetic pole portion 31 and the opposite output side end magnetic pole portion 33 constitute a pair of end magnetic pole portions positioned at both ends of the magnetic pole portions. The five intermediate magnetic pole portions 35 constitute a majority of the magnetic pole portions (31, 33, and 35).

When the bracket bush 29, the output side end magnetic pole portion 31, the opposite output side end magnetic pole portion 33, the five intermediate magnetic pole portions 35, and the six windings 23A to 23F are combined, the pair of connected portions 43 of the output side end magnetic pole portion 31, the pair of connected portions 49 of the opposite output side end magnetic pole portions 33, and the pairs of connected portions 55 of the five intermediate magnetic pole portions 35 are disposed along the shaft 5, thereby forming a pair of connected portion arrays 57 shown in FIG. 1. The first slide shaft 37A and the second slide shaft 37S respectively pass through the pairs of connected portions (43, 49, 55) that form the pair of connected portion arrays 57.

Each of the first slide shaft 37A and the second slide shaft 37B fixed to the core unit 25 is formed of stainless steel and has a cylindrical shape. A cooling medium (water) for cooling the windings 23A to 23F may be flown through the hollow inside of each of the first and second slide shafts 37A and 37B of the cylindrical shape, as necessary. The first and second slide shafts 37A and 37B pass through the core unit 25 in a direction parallel with the axial direction of the shaft 5 to protrude from the output side end magnetic pole portion 31 and the opposite output side end magnetic pole portion 33 at both sides of the core unit 25 it the axial direction. Both ends of the first slide shaft 37A are respectively fit into the first slide bearing 11A and the second slide bearing 11B. Both ends of the second slide shaft 37B are respectively fit into the third slide bearing 11C and the fourth slide bearing 11D. The first slide shaft 37A is slidably supported by a pair of the slide bearings (first and second slide bearings 11A and 11B), and the second slide shaft 37B is slidably supported by a pair of the slide bearings (third and fourth slide bearings 11C and 11D). With this support structure, the shaft 5 of the first assembly 1 is positioned in the centers of the through-holes (such as the through-holes 41a, 47a) of the core unit 25. A coil spring 59 is fit on the second slide shaft 37B. The coil spring 59 is disposed between she core unit 25 and the second connecting member 9B with the coil spring 59 fit on the second slide shaft 37B. The coil spring 59 generates a biasing force for biasing the core unit 25 in a direction apart from the second connecting member 9B when the core unit 25 approaches the second connecting member 9B. Assume that the linear synchronous motor is disposed such that the core unit 25 reciprocates in a vertical direction on the page of FIG. 1. Then, the core unit 25 with this structure may be prevented from falling toward the second connecting member 9B by the biasing force of the coil spring 59 by positioning the second connecting member 9B below relative to the core unit 25. A coil spring may be of course fit on the first slide shaft 37A as well, and may be disposed between the core unit 25 and the second connecting member 9B.

Figure 8A:
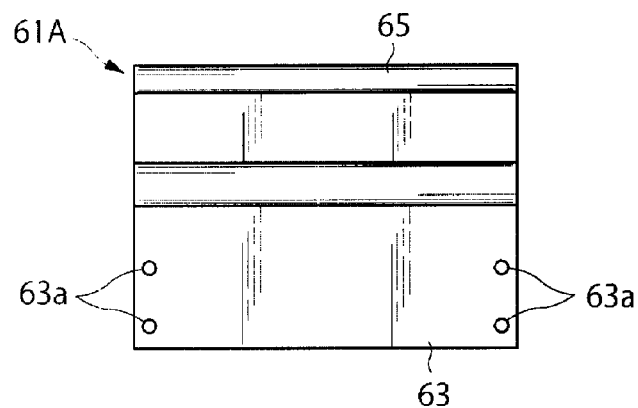
FIG. 8A is a front view of a first divided frame member used in the linear synchronous motor shown in FIG. 1.
Figure 8B:
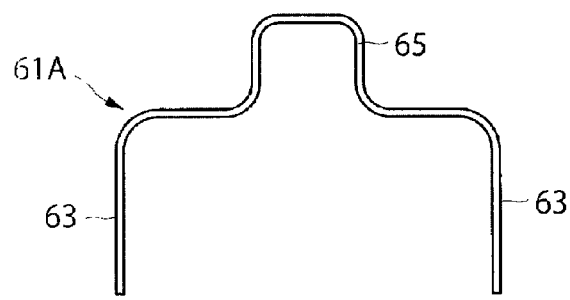
FIG. 8B is a right side view of the first divided frame member used in the linear synchronous motor shown in FIG. 1.
Figure 8C:
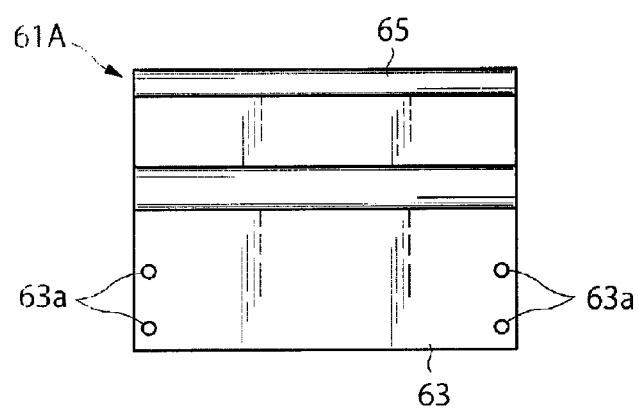
FIG. 8C is a rear view of the first divided frame member used in the linear synchronous motor shown in FIG. 1.

A frame member 39 is disposed on an outer periphery of the core unit 25. The frame member 39 includes a first divided frame member 61A and a second divided frame member 61B which are disposed to each other with a gap interposed therebetween. Each of the first divided frame member 61A and the second divided frame member 61B is formed of a magnetic conductive material of a thickness of 2 mm. As shown in FIGS. 8A to 8C, the first divided frame member 61A covers most of an upper half of the core unit 25 between the output side end magnetic portion 31 and the opposite output side end magnetic pole portion 33 positioned on an upper side on the pages of FIGS. 1 to 3. FIGS. 8A to 8C are a front view, a right side view, and a rear view of the first divided frame member 61A. The first divided frame member 61A includes a pair of side portions 63 that contact half parts of the main body portions (41, 47, 53) of the magnetic pole portions (31, 33, 35) and a connecting portion 65 that contacts the first connected portions of the pairs of connected portions (43, 49, 55). Four through-holes 63a are formed in each side portion 63. Two through-holes 63a are formed at each of a pair of edge portions of the side portion 63. The first divided frame member 61A is then fixed to the output side end magnetic pole portion 31 and the opposite output side end magnetic pole portion 33 with screws 67 (shown in FIGS. 2 and 3) that are screwed into screw holes 31a (in FIG. 5) of the output side end magnetic pole portion 31 and screw holes 33a (in FIG. 6) of the opposite output side end magnetic pole portion, 33 through the through-holes 63a. The first divided frame member 61A magnetically connects to the output side end magnetic pole portion 31, the opposite output side end magnetic pole portion 33, and the five intermediate magnetic pole portions 35.

Figure 9A:
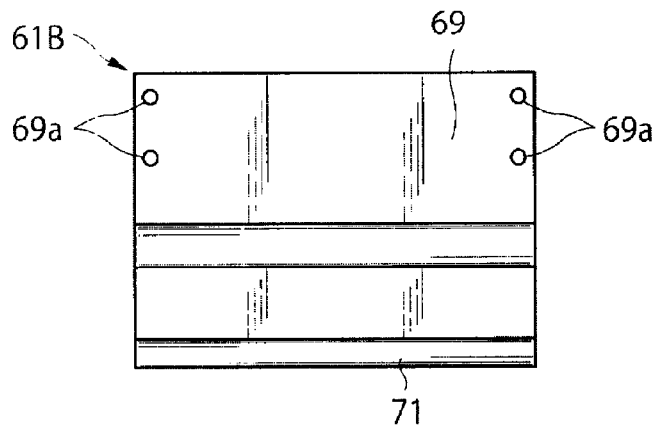
FIG. 9A is a front view of a second divided frame member used in the linear synchronous motor shown in FIG. 1.
Figure 9B:
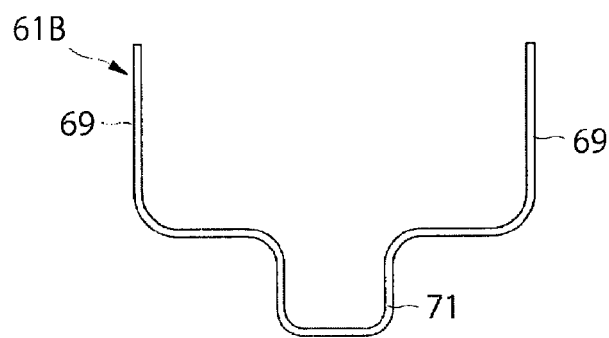
FIG. 9B is a right side view of the second divided frame member used in the linear synchronous motor shown in FIG. 1.
Figure 9C:
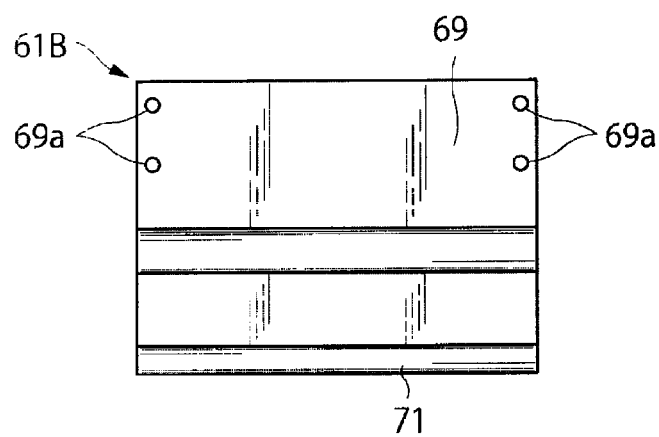
FIG. 9C is a rear view of the second divided frame member used in the linear synchronous motor shown in FIG. 1.

The second divided frame member 61B also has the same structure as the first divided frame member 61A. As shown in FIGS. 9A to 9C, the second divided frame member 61B covers most of a lower half of the core unit 25 between the output side end magnetic portion 31 and the opposite output side end magnetic pole portion 33 on the pages of FIGS. 1 to 3. FIGS. 9A to 9C are a front view, a right side view, and a rear view of the second divided frame member 61B. The second divided frame member 61B includes a pair of side portions 69 that contact half parts of the main body portions (41, 47, 53) of the magnetic pole portions (31, 33, 35) and a connecting portion 71 that contacts the second connected portions of the pairs of connected portions (43, 49, 55). Four through-holes 69a are formed in each side portion 69. Two through-holes 69a are formed at each of a pair of edge portions of the side portion 69. The second divided frame member 61B is then fixed to the output side end magnetic pole portion 31 and the opposite output side end magnetic pole portion 33 with screws 73 (shown in FIGS. 1 to 3) that are screwed into the screw holes 31b (in FIG. 5) of the output side end magnetic pole portion 31 and the screw holes 33b (in FIG. 6) of the opposite output side end magnetic pole portion 33. The second divided frame member 61B magnetically connects to the output side end magnetic pole portion 31, the opposite output side end magnetic pole portion 33, and the five intermediate magnetic pole portions 35. The frame member 39 comprising the first divided frame member 61A and the second divided frame member 61B surrounds a periphery of the core unit 25 and centers on the shaft 5 to function as a yoke magnetically connecting the magnetic pole portions (31, 33, 35). As shown in FIGS. 2 and 3, a pair of gaps portions G1 and G2 extending in a direction in which the shaft 5 extends are formed between the first divided frame member 61A and the second divided frame member 61b. A mold portion 75 (shown in FIG. 1) made of an insulating molding resin is formed between the respective first and second divided frame members 61A and 61B and the windings 23A to 23F. In this embodiment, with the first divided frame member 61A and the second divided frame member 61B mounted on the core unit 25, each of the first divided frame member 61A and the second divided frame member 61B is filled with the insulating mold resin. For this reason, when filling the insulating mold resin, the structure of a mold die may be simplified. The gap portion G1, which is one of the pair of gap portions G1 and G2, constitutes an injection port for filling the insulating mold resin when the second assembly 3 is manufactured. The other of the pair of gap portions G1 and G2 constitutes an air discharge port when the insulating mold resin is filled.

In the linear synchronous motor in this embodiment, when the core unit 25 of the second assembly 3 moves relative to the shaft 5 of the first assembly 1 in the axial direction, the first slide shaft 37A slides within the first and second slide bearings 11A and 11B, and the second slide shaft 37B slides within the third and fourth slide bearings 11C and 11D.

In the linear synchronous motor of this embodiment, the frame member 39 that surrounds the periphery of the core unit 25 functions as the yoke that magnetically connects the magnetic pole portions (31, 33, 35). For that reason, there is no need for using a heavy yoke used in a conventional linear synchronous motor. According to the present embodiment, the manufacturing cost of the linear synchronous motor may be reduced, and the weight of the linear synchronous motor may be lightened. Further, the first and second slide shafts 37A and 37B may be used as output shafts.

The above description was directed to an example where the two slide shafts (first and second slide shafts 37A and 37B) were used. One or not less than three slide shafts may be used.

The above description was directed to an example where the first assembly 1 including the array of permanent magnets was used as the stator and the second assembly 3 including the windings was used as the mover. The first assembly 1 including the array of permanent magnets may be used as the mover, and the second assembly 3 including the windings may be used as the stator. When the first assembly 1 including the array of permanent magnets is used as the mover, the weight of the mover may be lightened.

Figure 10:
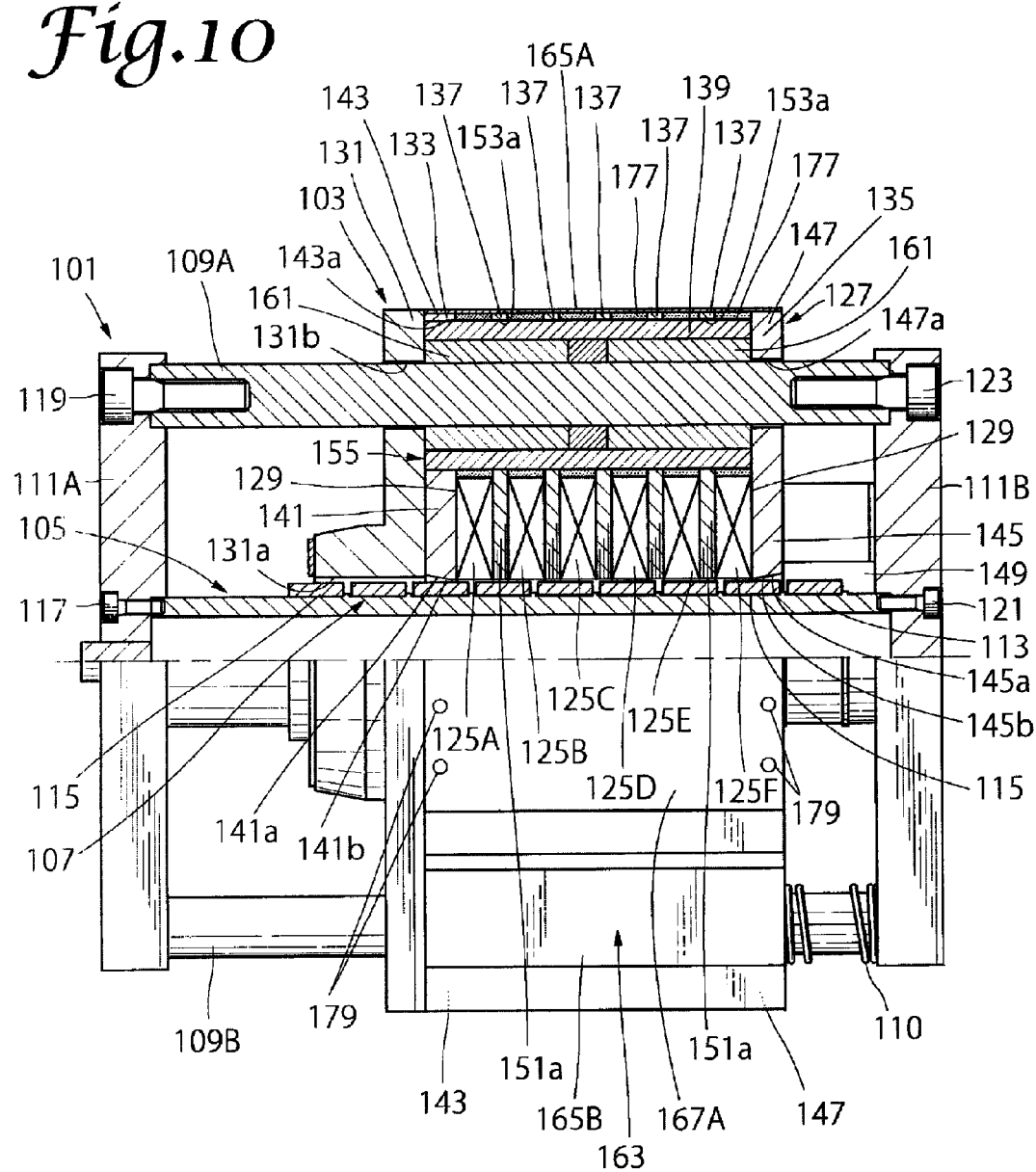
FIG. 10 is a vertical half-sectional view of a linear synchronous motor of another embodiment of the present invention.
Figure 11:
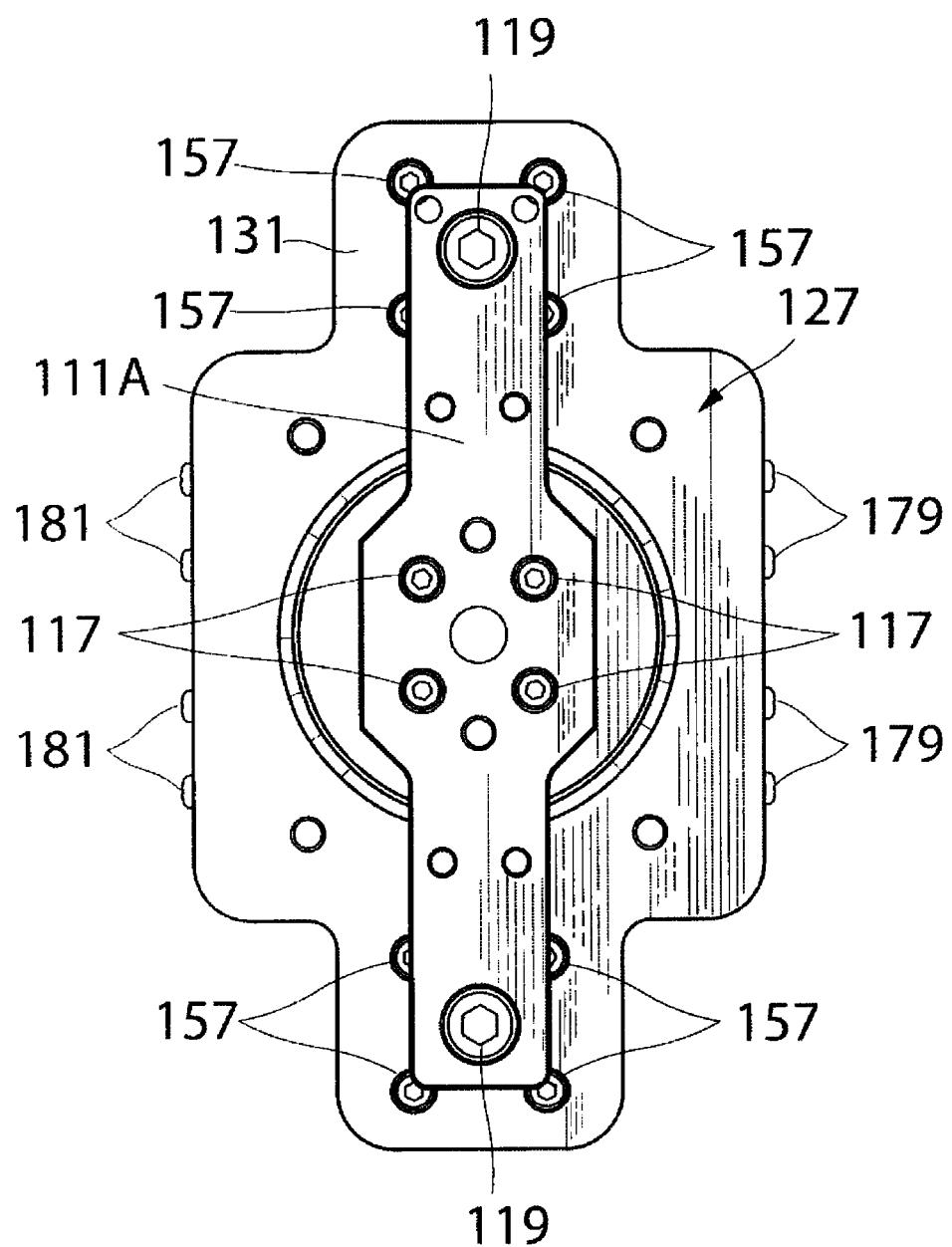
FIG. 11 is a left side view of the linear synchronous motor shown in FIG. 10.
Figure 12:
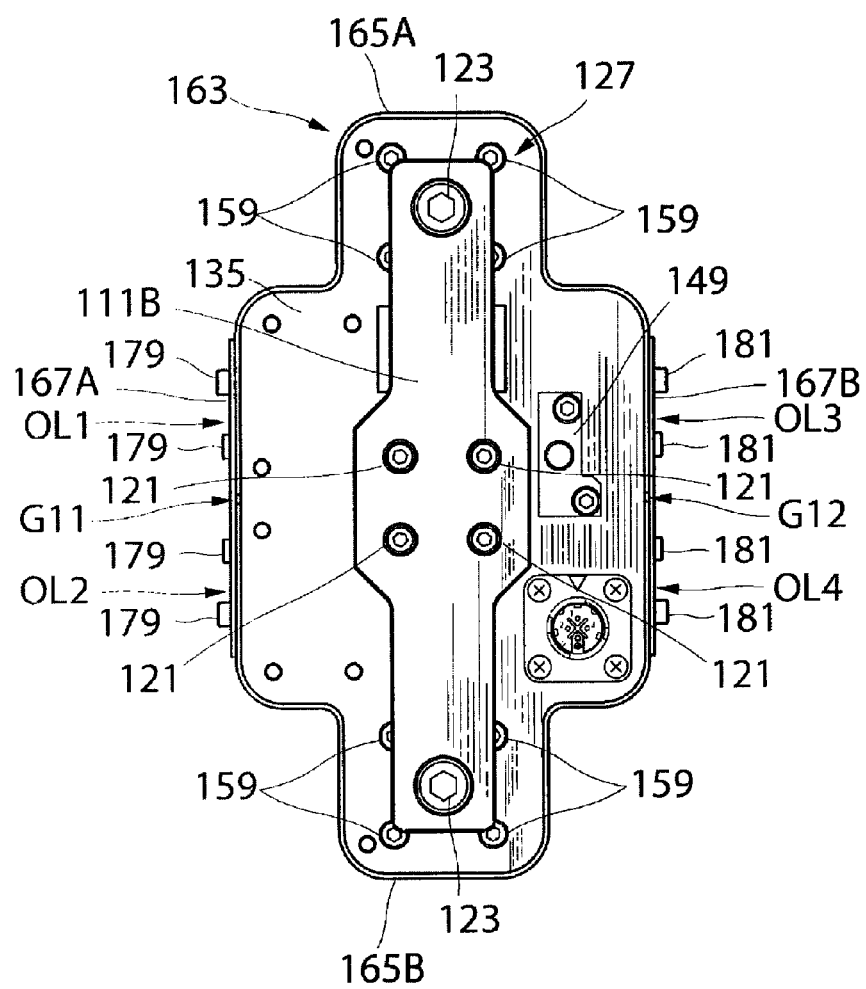
FIG. 12 is a right side view of the linear synchronous motor shown in FIG. 10.

FIGS. 10 to 12 are a front view, a left side view, and a right side view of a linear synchronous motor of another embodiment of the present invention. FIG. 10 is a vertical half-sectional view of the linear synchronous motor centering on an axial line of a shaft 105. As shown in FIG. 10, the linear synchronous motor in this embodiment includes a first assembly 101 configured to work as a mover and a second assembly 103 configured to work as a stator. The first assembly 101 includes the shaft 105, an array of permanent magnets 107, a first guide shaft 109A, a second guide shaft 109B, a first connecting member 111A, a second connecting member 111B, and a permanent magnet for detection 113. The shaft 105 is made of a magnetic material, has an elongated cylindrical shape, and reciprocates in an axial direction. The array of permanent magnets 107 is fitted with an outer periphery of the shaft 105, and is constituted from eight circular annular permanent magnets 115 arranged in the axial direction of the shaft 105. The eight permanent magnets are constituted from four circular annular permanent magnets magnetized such that N-pole appears on a radially outer surface of the shaft 105, and four circular annular permanent magnets magnetized such that S-pole appears on the radially outer surface of the shaft 105. These eight permanent magnets are arranged such that the N-pole and the S-pole alternately appear in the axial direction. In this embodiment, one permanent magnet 115 is constituted from six circular arc-shaped permanent magnet pieces arranged in a peripheral direction of the shaft 105. The permanent magnet pieces are fixed to the shaft 105 by adhesive.

Each of the first and second guide shafts 109A and 109D is made of stainless steel, and has an elongated cylindrical shape. The first and second guide shafts 109A and 109B are disposed to extend in parallel with the shaft 105. The first and second guide shafts 109A and 109B are then connected to the shaft 105 via the first and second connecting members 111A and 111B. Each of the first and second guide shafts 109A and 109B is slidably supported by a set of slide bearings 161. The set of the linear bearings 161 are provided in each of a pair of cylindrical members 139 which will be described later. With this support structure, the shaft 105 of the first assembly 101 is positioned at the center of the second assembly 103. A coil spring 110 is fit on the second guide shaft 109B. The coil spring 110 is disposed between a core unit 127 and the second connecting member 111B with the coil spring 110 fit into the guide shaft 109B. The coil spring 110 generates a biasing force for biasing the core unit 127 in a direction apart from the second connecting member 111B when the core unit 127 approaches the second connecting member 111B. Assume that the linear synchronous motor is disposed such that the shaft 105 vertically reciprocates on the page of FIG. 10. Then, the second connecting member 111B with this structure may be prevented from falling toward the core unit 127 by the biasing force of the coil spring 110 by positioning the second connecting member 111B above relative to the core unit 127.

A coil spring may be of course fit on the first guide shaft 109A as well, and may be disposed between the core unit 127 and the second connecting member 111B.

The first connecting member 111A is made of aluminum. The first guide shaft 109A has first and second end portions. The second guide shaft 109B has first and second end portions. As shown in FIG. 11, one end portion of the shaft 105 is connected to a central portion of the first connecting member 111A by four screws 117. The first end portions of the first and second guide shafts 109A and 109B are respectively connected to both end portions of the first connecting member 111A by screws 119. The second connecting member 111B is also made of aluminum. As shown in FIG. 12, the other end portion of the shaft 105 is connected to a central portion of the second connecting member 111B by four screws 121. The second end portions of the first and second guide shafts 109A and 109B are connected to both end portions of the second connecting member 111B by screws 123. With this arrangement, the first and second guide shafts 109A and 109B and the shaft 105 are connected by the first and second connecting members 111A and 111B.

The second assembly 103 includes six windings 125A to 125F and the core unit 127. The six windings 125A to 125F are each formed of an annularly wound winding conductor. The windings 125A to 125F are arranged at intervals in the axial direction of the shaft 105 to surround the shaft 105. Three phases (U phase, V phase, and W phase) of excitation currents mutually shifted by an electrical angle of 120° flow into the six windings 125A to 125F. More specifically, the excitation currents of U phase, -U phase, -V phase, V phase, W phase, -W phase respectively flow into the six windings 125A to 125F. Each of the windings 125A to 125F is held in a bobbin 129 which is similar to the bobbin 27 shown in FIGS. 4A to 4C.

The core unit 127 includes an end bracket 131, an output side end magnetic pole portion 133, an opposite output side end magnetic pole portion 135, and five intermediate magnetic pole portions 137. The end bracket 131 is formed by cutting a non-magnetic material such as an aluminum plate. As shown in FIG. 10, a through-hole 131a for passing through the shaft 105 is formed in a central portion of the end bracket 131. Further, through-holes 131b for respectively passing through the first and second guide shafts 109A and 109B are formed in both end portions of the end bracket 131.

The output side end magnetic pole portion 133 includes a main body portion 141 located in the center thereof and a pair of connected portions 143 comprising a first connected portion and a second connected portion respectively located on upper and lower sides of the main body portion 141 on the page of FIG. 10. A connected portion 143 on the lower side in FIG. 10 is covered with a frame member 163. The output side end magnetic pole portion 133 is formed by cutting a magnetic steel plate of a predetermined thickness. A through-hole 141a for passing through the shaft 105 is formed in a central portion of the main body portion 141. For this reason, the pair of connected portions 143 are opposed to each other, centering on the shaft 105. An inner peripheral wall surface of the through-hole 141a then constitutes a magnetic pole surface 141b. The magnetic pole surface 141b is configured so that, the more the magnetic pole surface 141b is apart from the adjacent intermediate magnetic pole portion 137 in the axial direction, the gap between the magnetic pole surface 141b and the array of permanent magnets 107 increases more. Through-holes 143a for respectively passing through the pair of cylindrical members 139 are formed in the respective centers of the pair of connected portions 143.

The opposite output side end magnetic pole portion 135 includes a main body portion 145 located in the center thereof and a pair of connected portions 147 comprising a first connected portion and a second connected portion respectively located on upper and lower sides of the main body portion 145 on the page of FIG. 10. A connected portion 147 on the lower side in FIG. 10 is covered with the frame member 163. The opposite output side end magnetic pole portion 135 is formed by cutting a magnetic steel plate of a predetermined thickness. A through-hole 145a for passing through the shaft 105 is formed in a central portion of the main body portion 145. The pair of connected portions 147 are opposed to each other, centering on the shaft 105. An inner peripheral wall surface of the through-hole 145a then constitutes a magnetic pole surface 145b. The magnetic pole surface 145b is configured so that, the more the magnetic pole surface 145b is apart from the adjacent intermediate magnetic pole portion 137 in the axial direction, the gap between the magnetic pole surface 145b and the array of permanent magnets 107 increases more. Through-holes 147a for respectively passing through the first and second guide shafts 109A and 109B are formed in the respective centers of the pair of connected portions 147. A hall element 149 is fixed to an outer surface of the opposite output side end magnetic pole portion 135. The permanent magnet for detection 113 is provided at the shaft 105 to face the hall element 149. Then, magnetic pole detection is performed by the hall element 149 and the permanent magnet for detection 113.

As shown in FIG. 13, each of the five intermediate magnetic pole portions 137 includes a main body portion 151 having a rectangular contour and a pair of connected portions 153 comprising a first connected portion and a second connected portion respectively located on upper and lower sides of the main body portion 151 on the page of FIG. 13. The intermediate magnetic pole portions 137 are formed by laminating a plurality of magnetic steel plates in the axial direction of the shaft 105. As shown in FIG. 10, the five intermediate magnetic pole portions 137 are disposed in the axial direction between the output side end magnetic pole portion 133 and the opposite output side end magnetic pole portion 135. A through-hole 151a for passing through the shaft 105 is formed in a central portion of the main body portion 151. The pair of connected portions 153 are opposed to each other, centering on the shaft 105. Then, an inner peripheral wall surface of the through-hole 151a constitutes a magnetic pole wall surface facing the array of permanent magnets 107 of the first assembly 101 with a predetermined gap therebetween. A through-hole 151b is formed in a corner of the main body portion 151. A bobbin fitting slot 151c for fitting a protruding portion (refer to reference numeral 27d in FIGS. 4A to 4C) of the bobbin 129 thereinto is formed between the through-hole 151a and the through-hole 151b. The bobbin fitting slot 151c communicates with the through-hole 151b. Through-holes 153a for respectively passing through the pair of cylindrical members 139 are formed in the respective centers of the pair of connected portions 153.

In this embodiment, as shown in FIG. 10, the output side end magnetic pole portion 133, the five intermediate magnetic pole portions 137, and the opposite output side end magnetic pole portion 135 are disposed at intervals in the axial direction such that two adjacent magnetic pole portions (133 and 137, 137 and 137, 137 and 135) define a space therebetween where one of the windings (125A to 125F is disposed. In this embodiment, the output side end magnetic pole portion 133, the opposite output side end magnetic pole portion 135, and the five intermediate magnetic pole portions 137 constitute a plurality of magnetic pole portions. The output side end magnetic pole portion 133 and the opposite output side end side magnetic pole portion 135 constitute a pair of end magnetic pole portions positioned at both ends of the plurality of magnetic pole portions in the axial direction. The five intermediate magnetic pole portions 137 constitute a majority of the plurality of magnetic pole portions (133, 135, 137).

When the end bracket 131, the output side end magnetic pole portion 133, the opposite output side end magnetic pole portion 135, the five intermediate magnetic pole portions 137, and the six windings 125A to 125F are combined, the pair of connected portions 143 of the output side end magnetic pole portion 133, the pair of connected portions 147 of the opposite output side end magnetic pole portion 135, and the pairs of connected portions 153 of the five intermediate magnetic pole portions 137 are disposed along the shaft 105, thereby forming a pair of connected portion arrays 155 (shown in FIG. 10). The pairs of connected portions (143, 147, 153) that form the pair of connected portion arrays 155 are connected by the pair of cylindrical members 139.

Figure 14A:
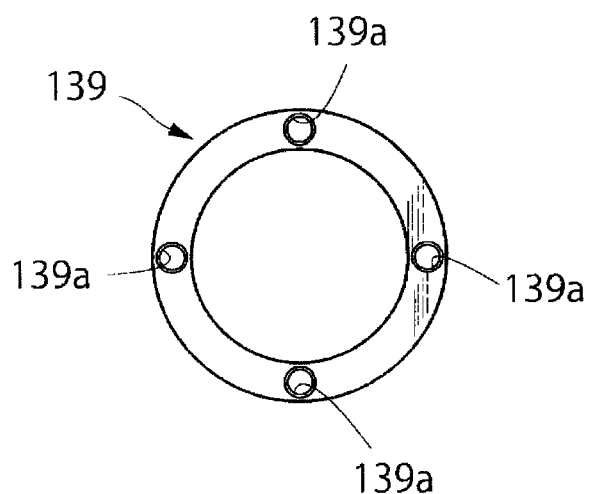
FIG. 14A is a left side view of a cylindrical member used in the linear synchronous motor shown in FIG. 10.
Figure 14B:
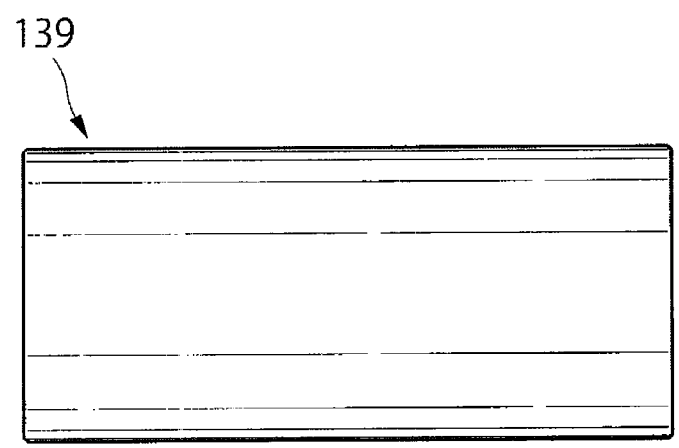
FIG. 14B is a front view of the cylindrical member used in the linear synchronous motor shown in FIG. 10.

Each of the pair of cylindrical members 139 fixed to the core unit 127 is unitarily formed of a magnetic material, and has a cylindrical shape, as shown in FIGS. 14A and 14B. As shown in FIG. 14A, four screw holes 139a are formed at both ends of each of the pair of cylindrical members 139. The pair of cylindrical members 139 pass through the core unit 127 in a direction parallel to the axial direction of the shaft 105, and the both ends of each cylindrical member 139 contact the end bracket 131 and the opposite output side end magnetic pole portion 135. The pair of cylindrical members 139 contact an inner peripheral surface of the through-hole 143a of the output side end magnetic pole portion 133 and inner peripheral surfaces of the through-holes 153a of the five intermediate magnetic pole portions 137. One end portion of each of the pair of cylindrical members 139 is fixed to the end bracket 131 by screws 157 (shown in FIG. 11) that are screwed into the screw holes 139a of the cylindrical member 139 through through-holes not shown and formed in the end bracket 131. The other end portion of each of the pair of cylindrical members 139 is fixed to the opposite output side end magnetic pole portion 135 by screws 159 (shown in FIG. 12) that are screwed into the screw holes 139a of the cylindrical member 139 through through-holes not shown and formed in the opposite output side end magnetic pole portion 135. As shown in FIG. 10, two slide bearings 161 for slidably supporting each of the first and second guide shafts 109A and 109B are disposed inside the pair of cylindrical members 139.

Figure 15A:
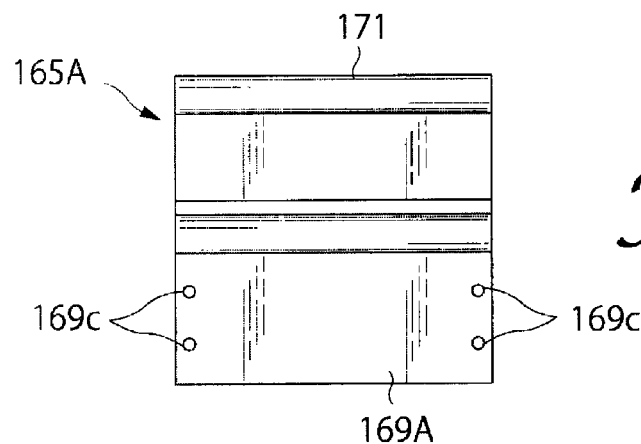
FIG. 15A is a front view of a first divided frame member of a first type used in the linear synchronous motor shown in FIG. 10.
Figure 15B:
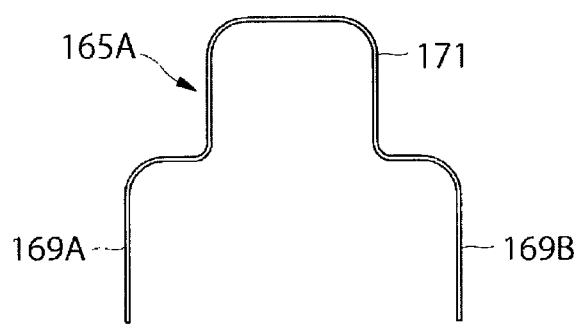
FIG. 15B is a right side view of the first divided frame member of the first type used in the linear synchronous motor shown in FIG. 10.
Figure 15C:
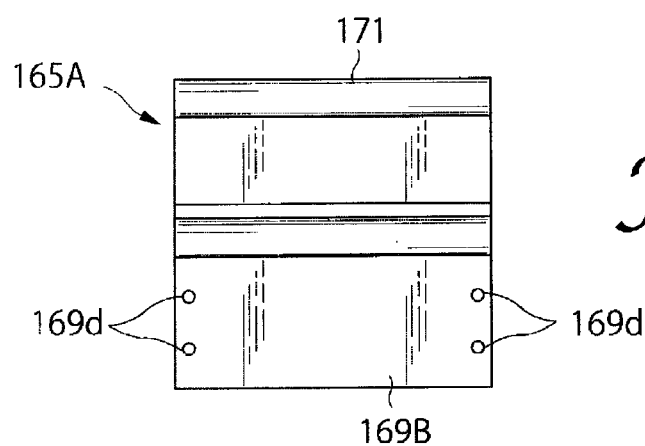
FIG. 15C is a rear view of the first divided frame member of the first type used in the linear synchronous motor shown in FIG. 10.

As shown in FIGS. 10 and 12, the frame member 163 is disposed on an outer periphery of the core unit 127. The frame member 163 includes divided frame members (165A, 165B) of a first type and divided frame members (167A, 167B) of a second type. The divided frame members (165A, 165B) of the first type includes a first divided frame member 165A and a second divided frame member 165B that are disposed to each other with a gap interposed therebetween. Each of the first and second divided frame members 165A and 165B of the first type is formed of a magnetic material with a thickness of 1.2 mm, and contacts an outer peripheral surface of the core unit 127. As shown in FIGS. 15A to 15C, the first divided frame member 165A of the first type covers most of an upper half of the core unit 127 between the output side end magnetic pole portion 133 and the opposite output side end magnetic pole portion 135 positioned on an upper side on each page of FIGS. 10 and 12. FIGS. 15A to 15C are a front view, a right side view, and a rear view of the first divided frame member 165A of the first type. The first divided frame member 165A includes a pair of side portions 169A and 169B that contact upper half parts of the main body portions (141, 145, 151) of the plurality of magnetic pole portions (133, 135, 137) and a connecting portion 171 that connects the pair of side portions 169A and 169B and contacts the first connected portions of the pairs of connected portions (143, 147, 153). Four through-holes 169c are formed in edge portions of one side portion 169A of the pair of side portions 169A and 169B. Four through-holes 169d are formed in edge portions of the other side portion 169B of the pair of side portions 169A and 169B.

Figure 16A:
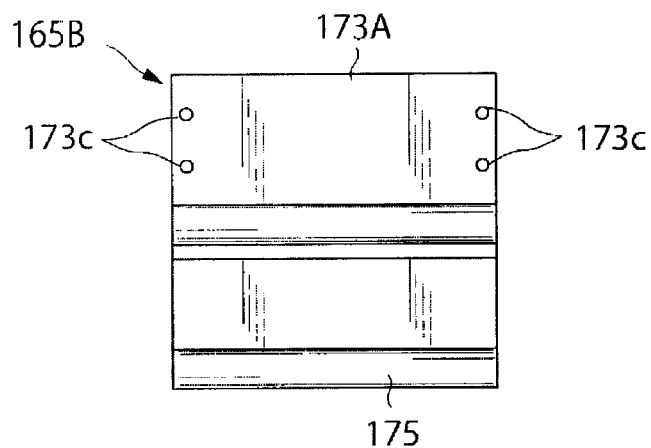
FIG. 16A is a front view of a second divided frame member of the first type used in the linear synchronous motor shown in FIG. 10.
Figure 16B:
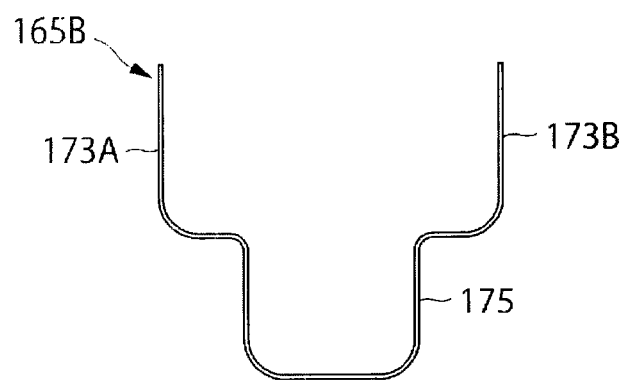
FIG. 16B is a right side view of the second divided frame member of the first type used in the linear synchronous motor shown in FIG. 10.
Figure 16C:
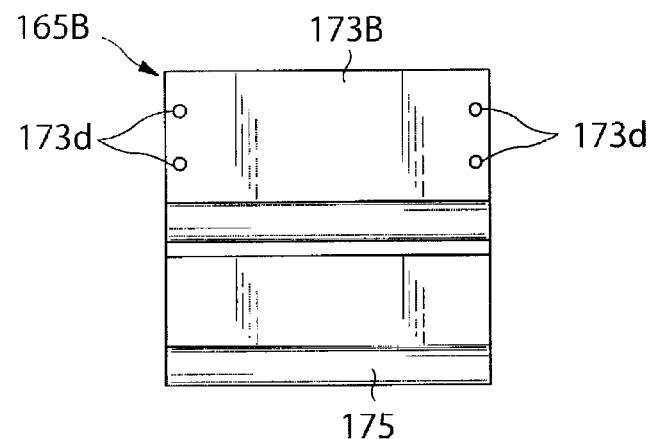
FIG. 16C is a rear view of the second divided frame member of the first type used in the linear synchronous motor shown in FIG. 10.

The second divided frame member 165B of the first type also has the same structure of the first divided frame member 165A of the first type. As shown in FIGS. 16A to 16C, the second divided frame member 165B of the first type covers most of the lower half of the core unit 127 between the output side end magnetic pole portion 133 and the opposite output side end magnetic pole portion 135 positioned on a lower side on each page of FIGS. 10 and 12. FIGS. 16A to 16C are a front view, a right side view, and a rear view of the second divided frame member 165B of the first type. The second divided frame member 165B of the first type includes a pair of side portions 173A and 173B that contact lower half parts of the main body portions (141, 145, 151) of the plurality of magnetic pole portions (133, 135, 137) and a connecting portion 175 that connects the pair of side portions 173A and 173B and contacts the second connected portions of the pairs of connected portions (143, 147, 153). Four through-holes 173c are formed in edge portions of the side portion 173A of the pair of side portions 173A and 173B. Four through-holes 173d are formed in edge portions of the other side portion 173B of the pair of side portions 173A and 173B.

As shown in FIG. 12, a pair of gap portions G11 and G12 extending in a direction where the shaft 105 extends are formed between the first divided frame member 165A of the first type and the second divided frame member 165B of the first type. A mold portion 177 (shown in FIG. 10) made of an insulating mold resin is formed between the respective divided frame members (165A and 165B) and the windings 125A to 125F. In this embodiment, with the divided frame members (165A, 165B) of the first type mounted on the core unit 127, each of the divided frame members (165A, 165B of the first type is filled with the insulating mold resin. For that reason, the structure of a mold die may be simplified. The gap portion G11, which is one of the pair of gap portions G11 and G12, constitutes an injection port for filling the insulating mold resin when the second assembly 103 is manufactured. The gap portion G12, which is the other of the pair of gap portions G11 and G12, constitutes an air discharge port when the insulating mold resin is filled.

Figure 17:
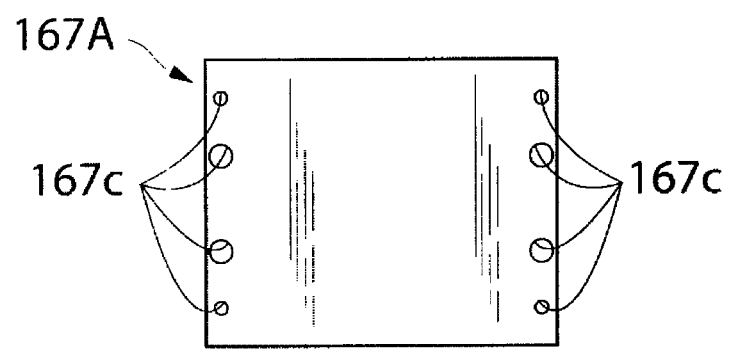
FIG. 17 is a front view of a first divided frame member of a second type used in the linear synchronous motor shown in FIG. 10.

The divided frame members (167A, 168B) of the second type includes a first divided frame member 167A and a second divided frame member 167B. As shown in FIG. 17, each of the first and second divided frame members 167A and 167B of the second type has a rectangular shape and is formed of a magnetic material with a thickness of 1.2 mm, like the divided frame members (165A, 165B) of the first type. Four through-holes 167c are formed in each end portions of the first divided frame member 167A of the second type. As shown in FIG. 12, the first divided frame member 167A of the second type is disposed across faced portions of the two divided frame members (165A, 165B) of the first type on one side to cover the gap portion G11. The first divided frame member 167A of the second type is fixed to the end magnetic pole portions (133, 135) of the core unit 127, together with the divided frame members (165A, 165B) of the first type, with screws 179. The screws 179 pass through the through-holes 167c (in FIG. 17) formed in the first divided frame member 167A of the second type, the through-holes 169c (in FIG.

15A) formed in one side portion 169A of the first divided frame member 165A of the first type, and the through-holes 173c (in FIG. 16A) formed in one side portion 173A of the second divided frame member 165B of the first type, and are then screwed into screw holes formed in the end magnetic pole portions (133, 135).

Figure 18:
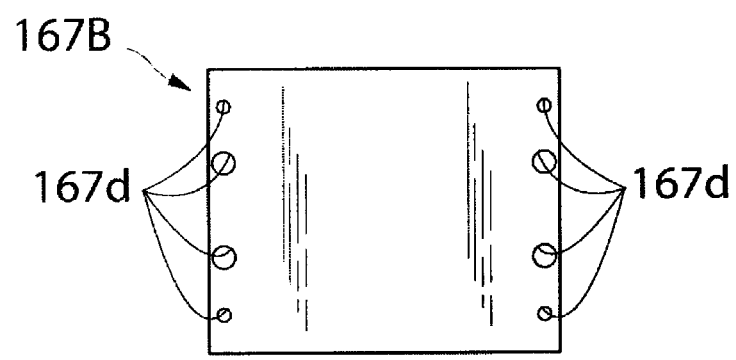
FIG. 18 is a front view of a second divided frame member of the second type used in the linear synchronous motor shown in FIG. 10.

As shown in FIG. 18, the second divided frame member 167B of the second type also has a rectangular shape, and is formed of a magnetic material with a thickness of 1.2 mm, like the first divided frame member 167A of the second type. Four through-holes 167d are formed in each edge portion of both ends of the second divided frame member 167B of the second type. As shown in FIG. 12, the second divided frame member 167B of the second type is disposed across faced portions of the two divided frame members (165A, 165B) of the first type on the other side to cover the gap portion G12. The second divided frame member 167B of the second type is fixed to the end magnetic portions (133, 135) of the core unit 127, together with the divided frame members (165A, 165B) of the first type, with screws 181. The screws 181 pass through the through-holes 167d (in FIG. 18) formed in the second divided frame member 167B of the second type, the through-holes 169d (in FIG. 15C) formed in the other side portion 169B of the first divided frame member 165A of the first type, and the through-holes 173d (in FIG. 16C) formed in the other side portion 173B of the second divided frame member 165B of the first type, and are then screwed into the screw holes formed in the end magnetic pole portions (133, 135).

In this embodiment, four portions OL1 to OL4 where the divided frame members (165A, 165B) of the first type and the divided frame members (167A, 167B) of the second type overlap, as shown in FIG. 12, constitute a part of a yoke that magnetically connects the plurality of magnetic pole portions (133, 135, 137).

When the shaft 105 of the first assembly 101 moves in the axial direction relative to the core unit 127 of the second assembly 103 in the linear synchronous motor in this embodiment, the first and second guide shafts 109A and 109B slide within the slide bearings 161.

In the linear synchronous motor in this embodiment, the yoke is constituted from the frame member 163 and yoke elements formed of the pair of cylindrical members 139 that pass through the plurality of magnetic pole portions (133, 135, 137). In this case as well, an amount of each yoke element (of the pair of cylindrical members 139) made of the magnetic material may be reduced. Thus, the degree of freedom for design of the pair of cylindrical members 139 is increased. Further, the manufacturing cost of the linear synchronous motor may be reduced, so that the weight of the linear synchronous motor may be reduced.

While the preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A linear synchronous motor comprising:
   a first assembly configured to work as one of a mover and a stator, the first assembly including:
      a shaft; and
      at least one array of a plurality of permanent magnets mounted on the shaft; and,
   a second assembly configured to work as the other of the mover and the stator, the second assembly including:
      a plurality of windings each formed of an annularly wound winding conductor and disposed at predetermined intervals in an axial direction of the shaft to surround the shaft; and
      a core unit including:
         a plurality of magnetic pole portions formed by laminating a plurality of magnetic steel plates, and disposed concentrically with the shaft to surround the shaft and also disposed at intervals in the axial direction such that two adjacent magnetic pole portions define a space therebetween where one of the windings is disposed, the magnetic pole portions each including a magnetic pole surface facing the at least one array of the permanent magnets of the first assembly with a predetermined gap therebetween; and
         a yoke magnetically connecting the magnetic pole portions,
   wherein the second assembly includes:
      at least one slide shaft fixed to the core unit and disposed in parallel to the shaft, the at least one slide shaft passing through the core unit in a direction parallel to the axial direction; and
   the first assembly includes:
      at least one set of slide bearings that slidably supports both end portions of the at least one slide shaft.

2. The linear synchronous motor according to claim 1, further comprising a frame member surrounding the core unit and centering on the shaft,
   wherein the frame member is made of a magnetic conductive material to magnetically connect to the magnetic pole portions, thereby functioning as the yoke.

3. The linear synchronous motor according to claim 1, wherein
   the at least one set of slide bearings and end portions of the shaft are connected by a set of connecting members.

4. The linear synchronous motor according to claim 1, wherein
   the at least one slide shaft has a cylindrical shape; and
   a cooling medium for cooling the windings flows through a hollow inside of the at least one slide shaft.

5. The linear synchronous motor according to claim 1, wherein
   the frame member is formed of a plurality of divided frame members fixed to the core unit with screws.

6. The linear synchronous motor according to claim 5, wherein
   the divided frame members are constituted from divided frame members of a first type and a second type, the divided frame members of the first type contacting an outer peripheral surface of the core unit, the divided frame members of the second type being each disposed across faced portions of two divided frame members of the first type and fixed to the core unit with screws together with the two divided frame members of the first type.

7. The linear synchronous motor according to claim 5, wherein
   the magnetic pole portions are constituted from a pair of end magnetic portions positioned at both ends in the axial direction and one or more intermediate magnetic portions positioned between the pair of end magnetic pole portions; and
   the frame member is fixed to the pair of end magnetic pole portions with screws.

8. The linear synchronous motor according to claim 1, wherein
  the magnetic pole portions each include at least one connected portion;
  the magnetic pole portions are disposed such that the at least one connected portion of each magnetic pole portion is disposed along the shaft to form at least one array of the connected portions; and
  the at least one slide shaft passes through the connected portions that form the at least one array of the connected portions.

9. The linear synchronous motor according to claim 1, wherein
  a mold portion made of an insulating molding resin is formed between the frame member and the windings.

* * * * *